United States Patent
Ryan et al.

(10) Patent No.: US 7,818,714 B2
(45) Date of Patent: Oct. 19, 2010

(54) INTEGRATION OF PROCESS AND WORKFLOWS INTO A BUSINESS APPLICATION FRAMEWORK

(75) Inventors: Sean P. Ryan, Sammamish, WA (US);
Jerald K. Noll, Kirkland, WA (US);
Steven P. Anonsen, Fargo, ND (US);
Timothy J. Brookins, West Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 1238 days.

(21) Appl. No.: 11/227,651

(22) Filed: Sep. 15, 2005

(65) Prior Publication Data

US 2007/0061776 A1      Mar. 15, 2007

(51) Int. Cl.
*G06F 9/44* (2006.01)
(52) U.S. Cl. .................. 717/104; 717/114; 717/120; 719/315; 719/318
(58) Field of Classification Search .................. None
See application file for complete search history.

(56) References Cited

U.S. PATENT DOCUMENTS

| | | | |
|---|---|---|---|
| 6,275,824 B1 | 8/2001 | O'Flaherty et al. | |
| 6,621,505 B1 * | 9/2003 | Beauchamp et al. | 715/764 |
| 6,725,227 B1 | 4/2004 | Li | |
| 7,451,403 B1 * | 11/2008 | Srinivasan et al. | 715/763 |
| 2002/0095405 A1 | 7/2002 | Fujiwara | |
| 2003/0187848 A1 | 10/2003 | Ghukasyan et al. | |
| 2003/0224760 A1 | 12/2003 | Day | |
| 2005/0065927 A1 | 3/2005 | Nouri et al. | |
| 2006/0106765 A1 | 5/2006 | Froehlich et al. | |
| 2008/0320486 A1 * | 12/2008 | Bose et al. | 718/105 |

OTHER PUBLICATIONS

Related U.S. Appl. No. 11/203,922, filed Aug. 15, 2005.
Official Action dated Oct. 29, 2007, for U.S. Appl. No. 11/203,922, filed Aug. 15, 2005.
Final Official Action dated Jun. 26, 2008, for U.S. Appl. No. 11/203,922, filed Aug. 15, 2005.
Official Action dated Mar. 4, 2009, for U.S. Appl. No. 11/203,922, filed Aug. 15, 2005.
Banerjee, et al., J.; "Queries in Object-Oriented Databases", downloaded from IEEE Xplore on Feb. 26, 2009, pp. 31-38.
Official Action dated Aug. 18, 2009, for U.S. Appl. No. 11/203,922, filed Aug. 15, 2005.

* cited by examiner

*Primary Examiner*—Michael J Yigdall
(74) *Attorney, Agent, or Firm*—Westman, Champlin & Kelly, P.A.

(57) ABSTRACT

Process is integrated into a business application framework on which the process is built. The same programming model used by the framework is used for managing data operated on by the process and for interacting with and controlling the process.

18 Claims, 13 Drawing Sheets

461

New Requisition

Print...

Business Need: Needed for conference
Required By: 12/15/03

Requested Items

| Qty | Part Number | Description | Estimated Unit Price | Estimated Extended |
|---|---|---|---|---|
| 5 | DEMOLAPTOP | Standard issue deomo laptop | 1800.00 | 9000.00 |
| 200 | PRINT-002 | Copies of Vision Report | 3.00 | 600.00 |

Total Estimated Price: 9600.00

Save...  Submit...

Approve Requisition

Print...

Business Need: Needed for conference

Required By: 12/15/2003

Requested Items

| Qty | Part Number | Description | Estimated Unit Price | Estimated Extended |
|-----|-------------|-------------|---------------------|--------------------|
| 5   | DEMOLAPTOP  | Standard issue deomo laptop | 1800.00 | 9000.00 |
| 200 | PRINT-002   | Copies of Vision Report | 3.00 | 600.00 |

Total Estimated Price: 9600.00

Approve — 470

Reject — 472

INTEGRATION OF PROCESS AND WORKFLOWS INTO A BUSINESS APPLICATION FRAMEWORK

BACKGROUND

In some current business applications, the term "activity" is used to refer to logic or code that modifies or transforms data. In a business application, the activity may be business logic, but could effect a transformation or modification of data in a different way. For example, an activity might simply create informational data and place it in a location for a user to view (e.g., a simple notification).

Business process workflows are performed using a particular sequence or arrangement of activities. Some current business applications sequence activities without wait points, while some other applications stall the sequencing of activities while the system waits for a human response (such as an approval of an invoice, etc.).

Current business software applications that deal with process workflows suffer from disadvantages. Most are focused on transactions involving business data rather than on dynamic and ever-changing business-related processes. Business processes are either hard-coded within application business logic or bolted on after the fact using proprietary or off-the-shelf workflow technologies. In other words, process workflows are not automated very well in some current business applications.

One reason that automated process workflows have encountered difficulty is that there is currently no strong semantic link between data, activity, and process workflow. There have been some attempts to automate processes, and they have typically been made by workflow application vendors. Such vendors commonly build add-on applications that try to drive processes. These are frequently separate software packages from the application for which the process is to be automated, and hence they may not be integrated at all, with the application and its data. Some such workflow applications attempt to establish integration with the data of the application, but many do not and those that do require manual work by those installing the workflow application.

Similarly, these types of add-on applications for automating a process have conventionally had their own, independent programming model that must be used to interact with and control the process and to manage data used by, or operated on, by the process. Even though an environment in which the automated process was deployed already had other mechanisms for these things, there was no integration with the environment. This required developers and other users to learn an additional programming model only for the process, which was inefficient and cumbersome.

There are also a number of current document management systems. Such systems receive a document and flow it to different parties, and then store it. However, such document management systems have conventionally been highly customized solutions which cannot easily be generalized for use in other areas. While they manage documents and flow, the documents store semi-structured data, which typically have few internal rules for how they are structured (e.g. a document in a word processor). Where such rules exist, they are not part of the process itself. In contrast, business applications typically have highly structured data and potentially many rules about how that data may change and how that data influences the flow of the process.

It can thus be seen that some processes have been automated in software. However, this was done in a rigid, technology implementation-specific way that is not easily adaptable to meet changing business needs or technology implementation requirements. These approaches were not integrated well with their environment and required users or developers to learn a new programming model. With such approaches, business processes cannot be easily or cost-effectively modified or replaced and process automation has come at the cost of business and technology flexibility and agility.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Process is integrated into a business application framework on which the process is built. The same programming model used by the framework is used for managing data operated on by the process and for interacting with and controlling the process. Examples include operation and business logic. In addition, services provided by the framework can be used in relation to the process.

BRIEF DESCRIPTION OF THE DRAWINGS

FIGS. 8A and 8B illustrate exemplary user interfaces used in the process shown in FIG. 6.

DETAILED DESCRIPTION

The present invention relates to integration of a process into a framework. However, before describing the present invention in greater detail, one illustrative environment in which the present invention can be used will be described.

Figure 1:
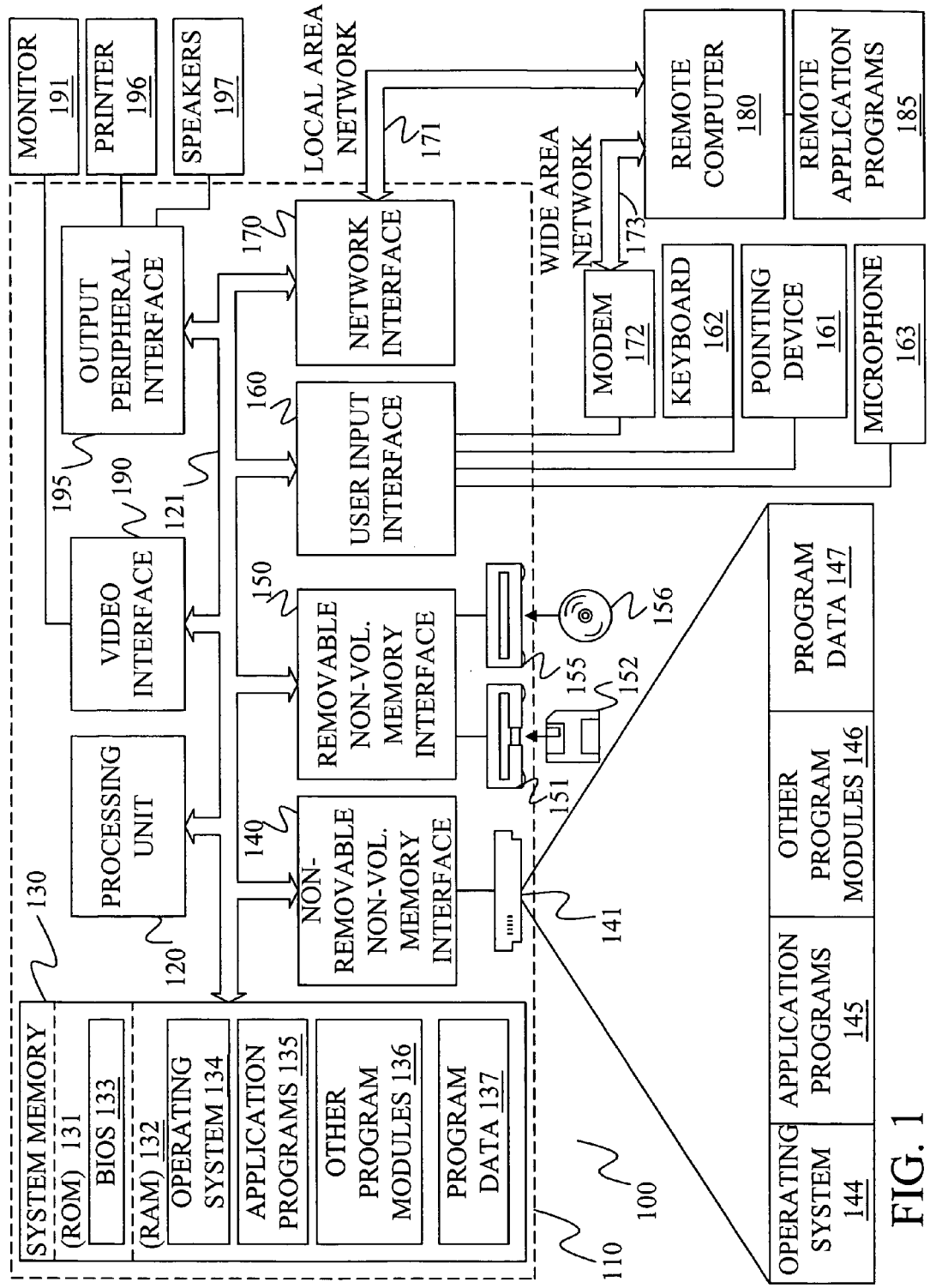
FIG. 1 is a block diagram of one computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
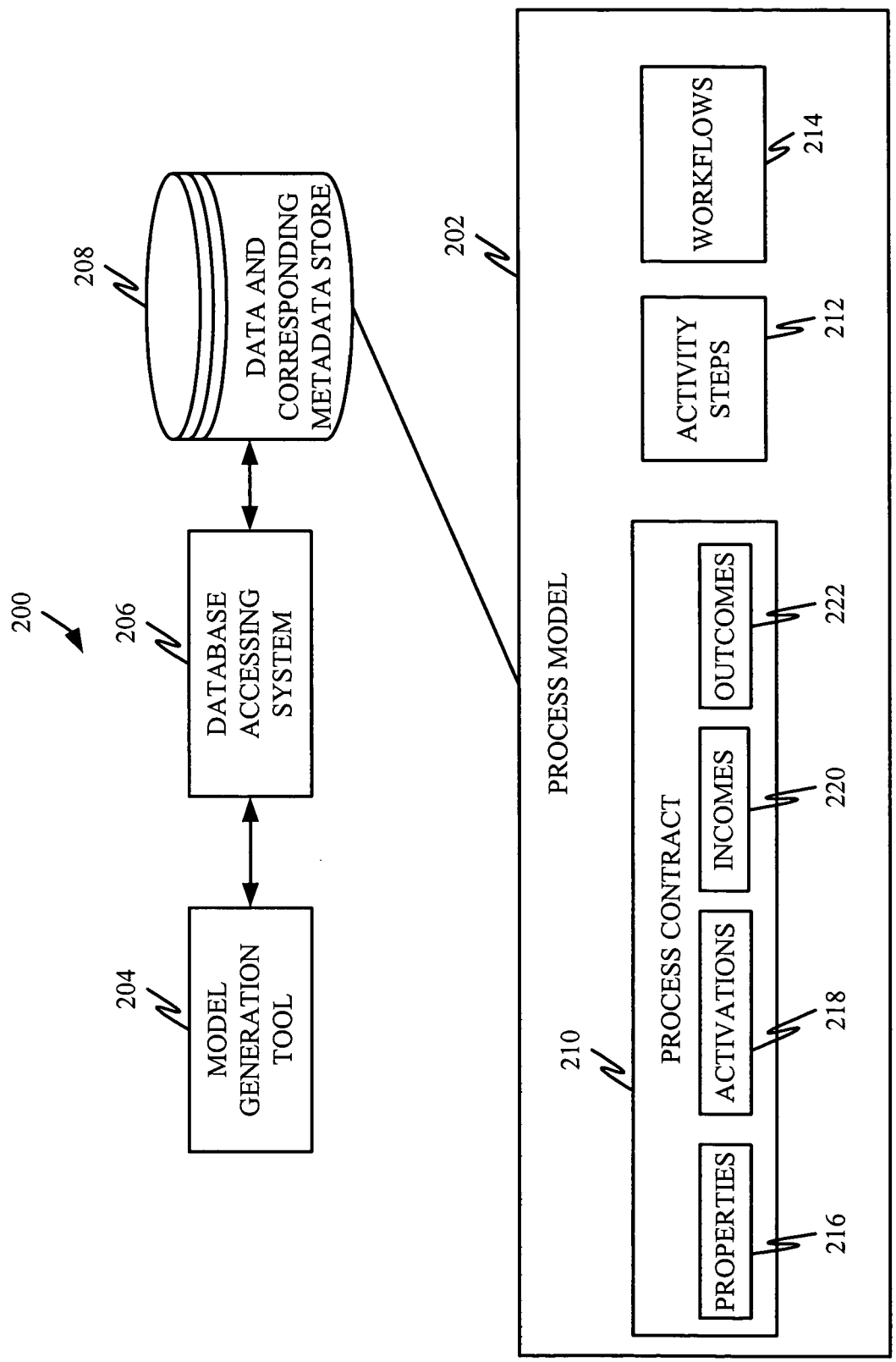
FIG. 2 is a block diagram illustrating one example of a process model.

Before describing how the process is integrated into a framework, one embodiment of a process model and a system for generating a process model definition will be described. FIG. 2 shows a model generation system 200 for generating a process model 202 in accordance with one embodiment. System 200 includes model generation tool 204, database accessing system 206, and data and corresponding metadata store 208. Model 202 is illustratively stored in data store 208. In one illustrative embodiment, a user uses tool 204 to define process model 202 in metadata and store it in database 208.

Process model 202 is illustratively a declarative model. (as opposed to imperative code) developed to describe processes within business software applications. The description abstractly defines a process and its relationship to other processes in a way that is independent of workflow technology implementations. It also uses mechanisms for managing data and dealing with business logic that already exist on the framework on which it is built. This is described in greater detail below. Model 202 illustratively captures data aspects of a business process and allows that data to be associated with other domain data, thus providing the ability to semantically link process with the data that is usually found in business applications.

More specifically, the process definition is similar to a type in that it can be instantiated any number of times. A process instance represents a running process. Process model 202 is an abstraction that semantically links the steps, data, and other elements necessary to achieve a business goal. It illustratively enables initiating, identifying, monitoring, coordinating, and completing the set of activities involved with obtaining the business objective.

In the embodiment shown in FIG. 2, process model 202 includes a process contract 210, a set of activity steps 212 and a set of workflows 214. The workflows 214 sequence activity steps 212 in such a way as to satisfy process contract 210.

More specifically, process contract 210 represents an interface for the process modeled by model 202. The contract 210 defines the initial and interim inputs and outputs to the process as well as the data properties for the process. Thus, items included within the process contract are properties 216, activations 218, incomes 220, and outcomes 222.

Properties 216 store the data attributes of a running process. Also, after a running process has concluded, properties 216 reflect the final process state. The set of properties 216 in contract 210 can be stored, for example, as an entity. An entity is an instance of a type having a set of properties, where the value of some set of those properties is unique for the entity within some scope. By defining properties 216 as entities, the model is highly useful, because management of the properties and querying of those properties can easily be implemented using the same technology as is used for all other application data.

More specifically, as is described below with respect to FIGS. 3 and 4, the entity is implemented by a framework on which the process is built. The framework may illustratively be a business framework which includes common building blocks, tools and services to create business applications. Such building blocks may include, for example, security tools and a web service interface. The framework can also be used to realize a mechanism for managing data and interacting with processes. For instance, the business framework may illustratively use entities to manage data and provide entity persistence such that data in the applications can be represented by entities and the entities can be saved to and retrieved from a database through the framework. The services provided by the framework may also include querying, analyzing and customizing data, among others. The framework may also provide a mechanism for interacting with and controlling a process. Such mechanisms may, for example, include operations. An operation is known and includes two portions. The first portion includes a message and a definition of the message. The second portion is a message processor that processes the message in some way. Entities and operations are described in greater detail below with respect to mechanisms for integrating the process and workflows into the framework.

The various parts of process model 202 shown in FIG. 2 will now be described in more detail. Activations 218 are illustratively operations that initiate the process modeled by model 202. Activations 218 can have input parameters that specify data. The input parameters are passed to an operation in the process as a data payload income to the process. As is discussed in greater detail below, the activations provide a mechanism for selectivity, to select among various workflows and initiate a selected workflow when the process is initiated.

Because the activations 218 are defined as operations, this enables the process to be initiated in different ways. It also allows workflows 214 to start with different payloads, and provides the ability to select the workflow 214 that gets initiated during activation of the process.

Incomes 220 are illustratively operations that provide a defined entry point into a running process. Incomes 220 may require and consume business data as an input. Zero or more incomes 220 are defined for a process modeled by model 202. Incomes 220 can represent either an external request that a process can act on or an external response that a process is waiting on. This provides the ability to call business logic or process control operations, and to provide data that a process is waiting for.

Outcomes 222 are operations that signify that a running process has concluded. They represent defined exit points from the running process, and may define and produce business data as an output. An outcome 222 can be marked as a required outcome or as an optional outcome. One or more outcomes 222 are illustratively defined for each process. Because outcomes 222 are defined as operations, they allow the process to return results and to signify conclusion of the process. They also provide a mechanism for the process to return data payloads.

Process model 202 also includes the activity steps 212 which represent the units of work that can be arranged in workflows. Each activity step 212 may, in one embodiment, be an operation, along with metadata, that binds data to the input and output parameters of the calls to the operation. The activity steps can be orchestrated within workflows 214, as is described in greater detail below.

There are illustratively a number of different types of activity steps 212. Some of those include business logic operation calls, which provide a linkage between processes and data in process model 202. With this linkage, one can determine what processes affect what data, and vice versa. Business logic operation calls may illustratively use entities to create or modify data. For instance, business logic operation calls may be handwritten imperative code created by business application developers.

A second kind of activity step 212 is a work item operation call (or work item). A work item generates a request for users to perform task-oriented work. A work item task is created and illustratively assigned to a user or role for completion. Model 202 provides semantic links to related information and actions that can be performed to complete the work. When the work is completed, the workflow receives the work item results, as is also described below with respect to FIG. 4.

Another activity step 212 is a subprocess operation call. A subprocess is a process which is called within another process. The parent process may continue and simply receive results of the subprocess when the subprocess calls back with data to the parent process, or the parent process may block and wait for the results of the subprocess to be returned.

Another activity step 212 is a milestone operation call. A milestone operation call can be used to announce the status of achieved milestones. Milestones thus may be used simply for visibility as indicating the status of the process, or in blocking further execution of the process until some time or event occurs. Milestones can also be used in customizations. This is described in greater detail below with respect to FIG. 8.

The activity steps 212 provide a context for operation calls and bind data to operation properties and bind operation results to process properties. They also allow for operation calls to be re-used in the same workflow or different workflows for a given process. They also simplify the workflow design process in that workflow designers may choose to orchestrate from a set of available activity steps within a given process model 202. The activity steps are declarative, which facilitates adapting and improving the process.

The process definition in process model 202 can have one or more workflows 214 defined for it. Each workflow arranges a set of activity steps 212 for execution. A number of different approaches can be used by workflows 214 in arranging activity steps 212. For instance, the activity steps 212 can be ordered in a sequential manner for a sequential workflow, or the activity steps can be arranged based on constraints in constraint-based workflows in which rules with associated actions determine workflow execution. Of course, other workflow arrangements can be used as well.

Each workflow 214 satisfies contract 210 in the process definition in model 202. As briefly mentioned above, a plurality of different workflows 214 can be defined in any given model definition. The workflow that gets selected for execution when a process is initialized is determined by the activation operation 218 which is called to initialize the process. A given workflow 214 can be selectable using a number of different selection mechanisms. For instance, a workflow 214 can be selected at deployment time based on the deployed configuration of the process. The workflow 214 can also be selected based on a runtime determination using imperative code, metadata lookup or using a business rule. The workflow 214 can also be selected at runtime by making a determination with another process workflow 214. Of course, other selection mechanisms can be used in the activations 218 to select a workflow 214 as well.

Because the process contract 210 is defined in an abstract way relative to the workflow 214, it does not change with different workflows 214. Therefore, the actual interface and the implementation of a process are separated. This allows workflows 214 that share contracts 210 to be interchanged. It also supports the ability to compose processes. For example, the development approach to composing a process separates the process designers and implementers into different roles, and often different individuals. By separating the interface and workflows of the process, they better fit the development approach to design. This type of abstract process definition may also be useful for documentation and library searches.

Workflows 214 enable process automation. They define the flows and constraints to determine the course of action taken by the process. They effectively connect applications and people to collaboratively perform work. They also allow for different implementations of a single process and the particular workflow 214 that gets run is chosen using a selector mechanism, as discussed above.

Figure 3:
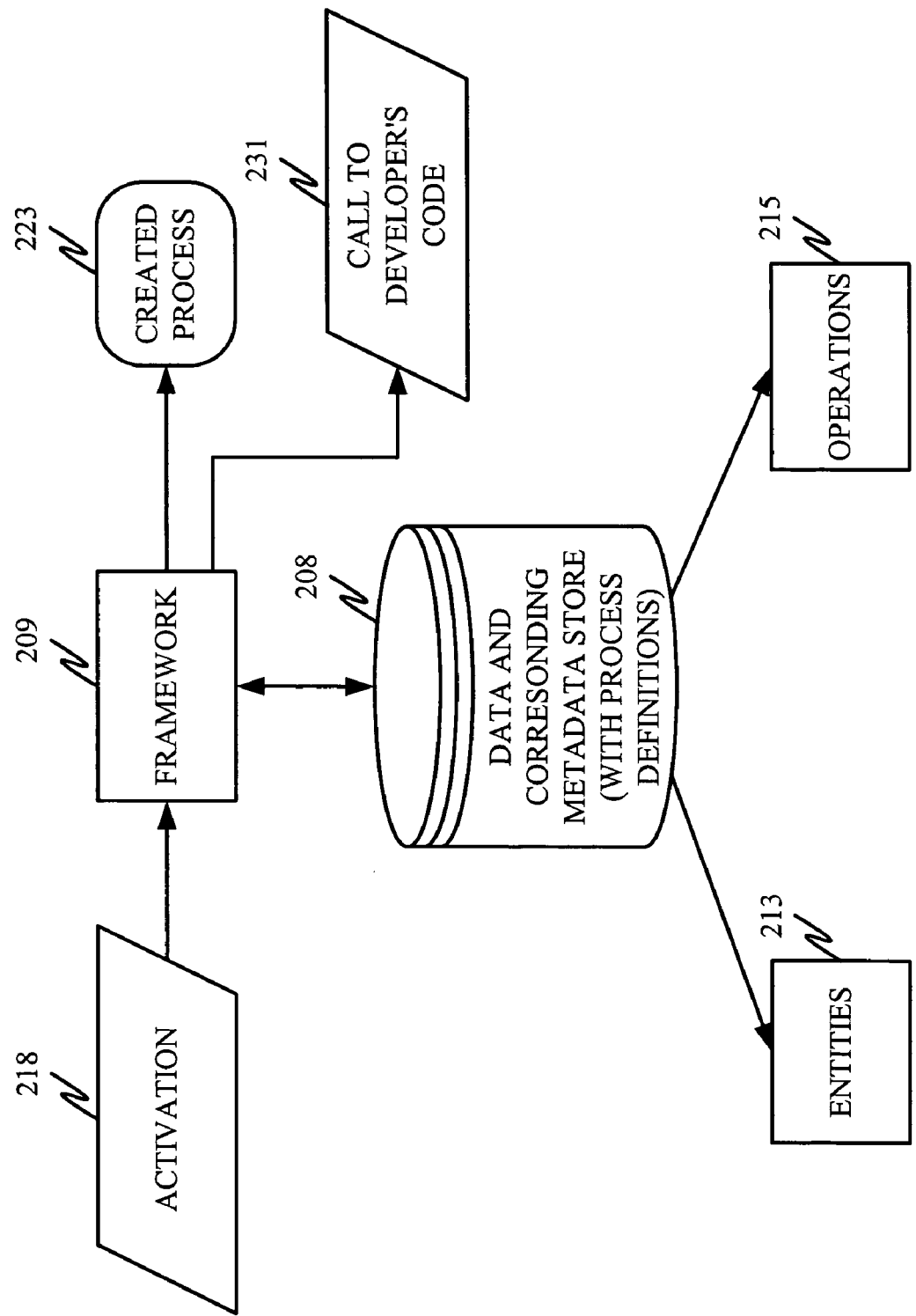
FIG. 3 is a block diagram showing a runtime environment in which a process definition is integrated into a framework.

FIG. 3 is a block diagram illustrating a runtime environment in which a process definition generated from process model 202, and stored in metadata store 208, is used by a framework 209. In the embodiment illustrated in FIG. 3, an activation 218 is realized as an operation call and is provided to framework 209. As discussed above, framework 209 illustratively provides tools, services, and common building blocks for generating business applications. Framework 209 also illustratively has its own programming model in which operation calls are used to interact with business logic, and in which entities are used for managing data in a process. Thus, a set of entities 213 are used to represent and manage the data in the process (such as properties 216), while a set of operations 215 are used for activations 218, incomes 220 and outcomes 222 in the contract. In order to define a process using a process model 202, the developer arranges metadata 208 such that activations 218 are associated with other items in the process contract as well as a set of activities steps 212 and work flows 214.

Figure 4:
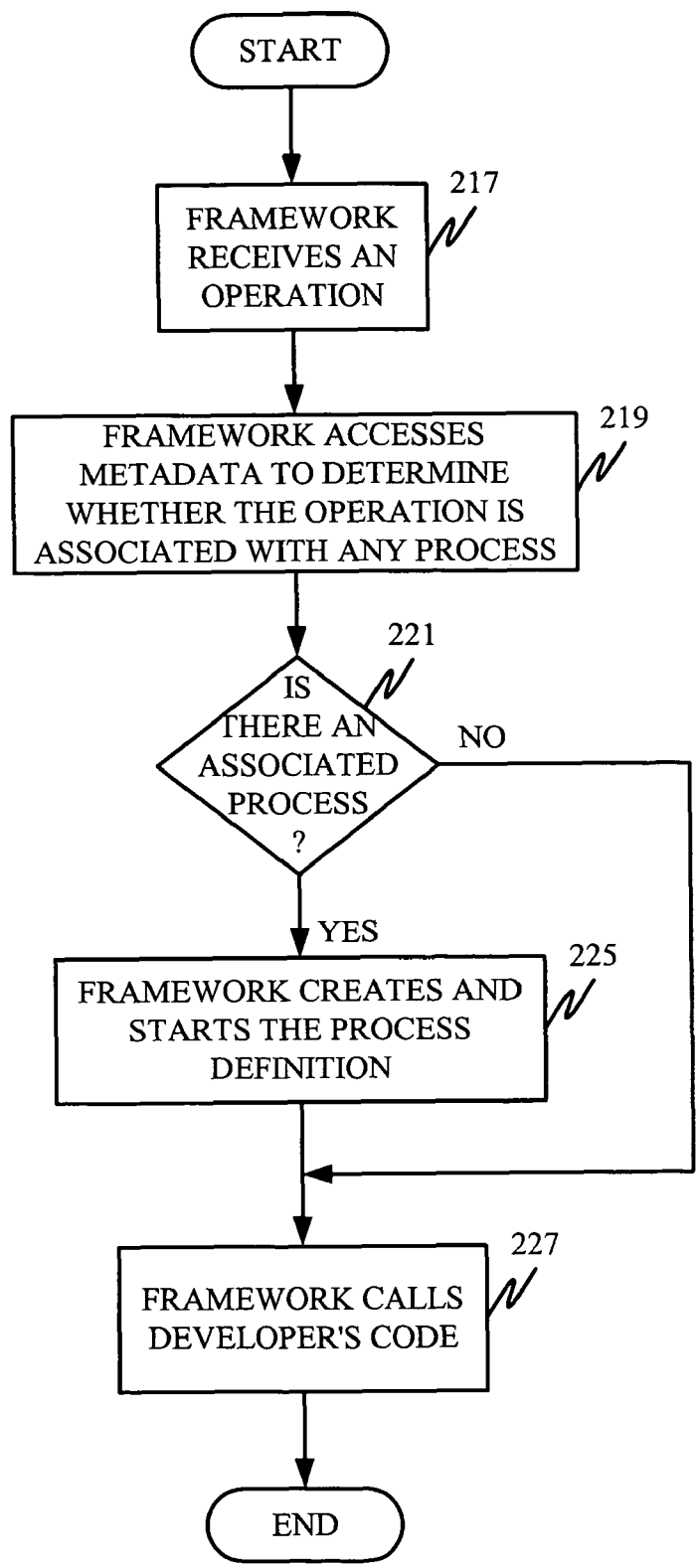
FIG. 4 is a flow diagram illustrating how a process is activated and created by the framework.

FIG. 4 is a flow diagram illustrating one embodiment of the operation of the runtime environment shown in FIG. 3. First, framework 209 receives the activation 218, which is illustratively an operation call. This is indicated by block 217 in FIG. 3. Framework 209 then accesses the metadata that describes the processes in the application 208 to determine whether the operation (activation 218) just received has any process associated with it. This is indicated by block 219 in FIG. 4. The way in which metadata 208 is configured to define a process is described in greater detail below. However, assume for the sake of the discussion with respect to FIG. 3 that framework 209 determines, from metadata in store 208, that activation 218 has a process associated with it. This is indicated by block 221 in FIG. 4. That being the case, framework 209 automatically creates a corresponding process instance by generating the entities necessary for the process, and by spinning up other mechanisms required to control the process. The created process is indicated by block 223 in FIG. 3, and creating the process and starting the process definition is indicated by block 225 in FIG. 4. Once the process is automatically created by framework 209, framework 209 calls any developer code 231 which must be called when the given process is created and started. This is indicated by 227 in FIG. 4. The developer's code 231 can then indirectly interact with the process 223, as desired by the developer. Because the developer's code can interact with the process simply by calling operations or changing entities, the developer's code need not even directly interact with or control the process.

If, at block 221, there is no process associated with the incoming operation (in that case it would not be an activation, but simply another messaging operation) then framework 209 simply calls the developer's code 231 and indicates that the operation has been received.

As mentioned, framework 209 has its own programming model for managing data and dealing with business logic. Conventional process management products have an additional, separate, and independent programming model for managing data and dealing with business logic which must be known by the developer for an application to interact with a process. Therefore, if a developer is to use a framework, such as framework 209 and a process, the developer needs to know both of the separate methods for managing data and dealing with business logic.

In contrast, one embodiment of the present process uses the mechanism in the framework 209 for managing data, as well as the mechanism in the framework 209 for interacting with business logic. Thus, the process in accordance with the present system is fully integrated with framework 209. In the embodiment described herein, the mechanism for managing data is realized using entities 213. The mechanism for dealing with business logic is realized using operations 215. Entities 213 and operations 215 are already used by framework 209. Therefore, because processes are defined in metadata using entities and operations, they are fully integrated with framework 209.

This can be advantageous. For instance, when writing application code, a process can be called in the same way as any other operation that the application might call. Instead of starting the process using a separate, independent programming model, the application simply calls an operation, which is already used by framework 209, to activate the process. Framework 209 then creates the entire process, even before the application knows the process has been created.

In addition, a process can be attached to an operation call later. For instance, this can be done in a new version of the application, or, if the application allows, as part of customizing the application.

Because many things can be built around entities and the basic messaging paradigm represented by the operation mechanism, those things are automatically available to processes. Similarly, when innovations are made in the area of entities or operations, those innovations are also available to processes, automatically.

Similarly, because processes use entities in framework 209, they gain all the benefits of entities, including leveraging services such as persistence storage, query capabilities, analytics and customization. When a process instance is activated, messages (activations, incomes and outcomes) are consumed and produced by the running process until it concludes. These messages, because they are built upon the operation abstraction are capable of leveraging all support available to operations in framework 209, such as robust messaging services and customization capabilities provided with plug-ins.

Figure 5:
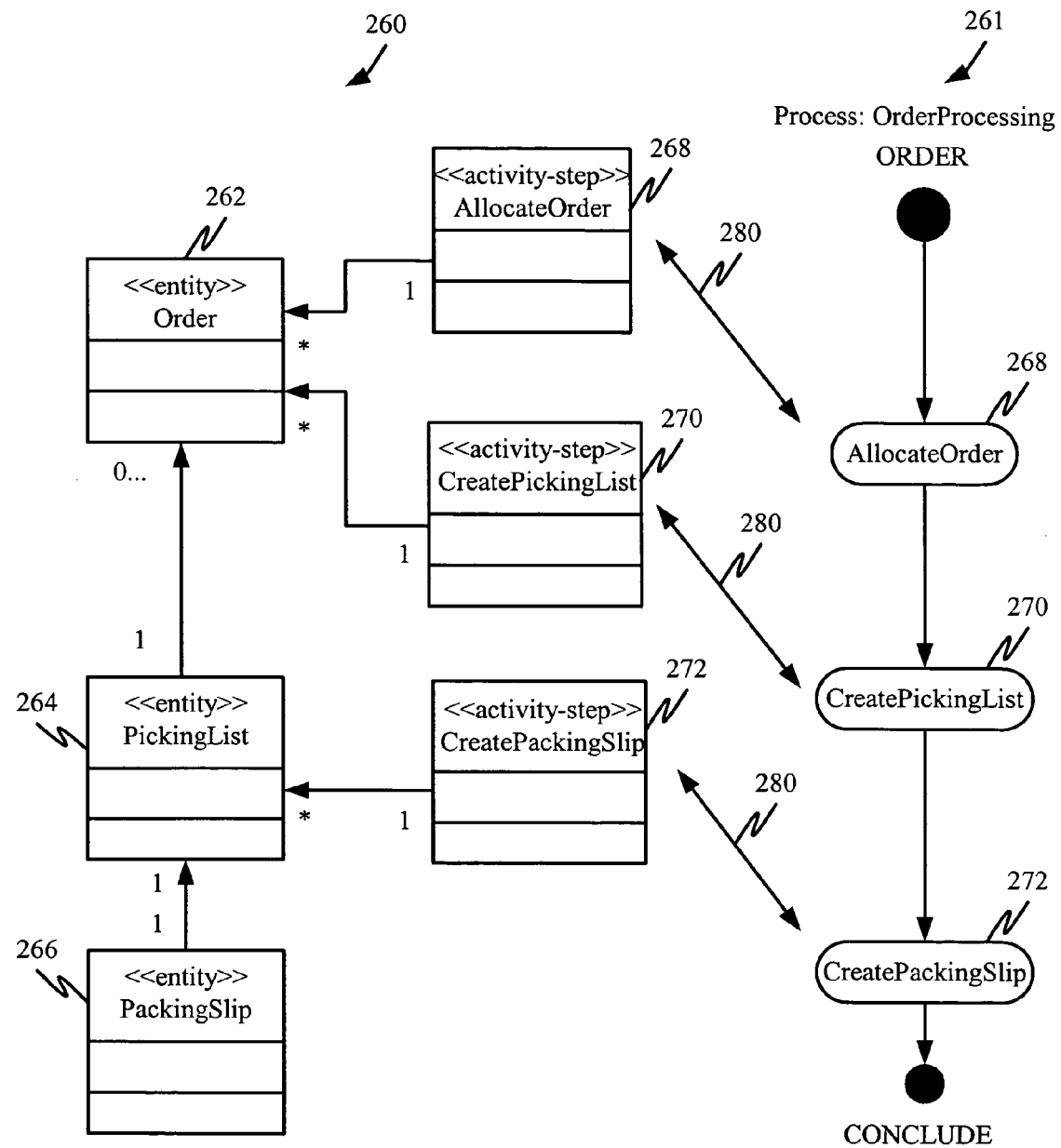
FIG. 5 shows a UML class diagram and a UML activity diagram illustrating one exemplary embodiment of a process model.

FIG. 5 is a diagram better illustrating how data, activity and process are semantically linked by model 202 in accordance with one embodiment. FIG. 5 illustrates a diagram of a model for an order processing process. In the process, an order is received and inventory is allocated to that order. A picking list is then generated such that employees in a warehouse can pick inventory items from shelves in order to fill the order. Once all of the items have been picked, they are packed for shipment and a packing slip is created.

FIG. 5 shows that one representation of data, activity, and process takes two different UML diagrams, diagrams 260 and 261. The first UML diagram 260 is a class diagram that shows an Order entity 262, a PickingList entity 264, a PackingSlip entity 266. Diagram 260 also includes an AllocateOrder activity 268, a CreatePackingList activity 270 and a CreatePackingSlip activity 272. The relationship between data (entity) and activities is captured by class diagram 260. It can be seen that Order entity 262 has zero or more PickingList and entities 264, and a given PickingList 264 has one PackingSlip 266. All of the activities 268, 270 and 272 are associated with an entity. With a simple user interface, where a list of data is displayed, a user can select an entity and be presented with a context menu which allows them to perform activities associated with the entity. Thus, given an entity, the user can easily discover which activities can operate on that entity.

The relationship between activities and process is captured by UML activity diagram 261. The activity diagram 261 illustrates an OrderProcessing process in which the AllocateOrder activity 268, the CreatePackingList activity 270 and the CreatePackingSlip activity 272 are sequenced into a workflow 214. Thus, the activities provide the linkage between the diagrams 260 and 261. This linkage is represented by arrows 280 and can be used to traverse between the two model diagrams 260 and 261.

The process represented by diagram 261 begins when a new order is entered. The process then executes the AllocateOrder activity 268, the PickingList activity 270, and a CreatePackingSlip activity 272 in sequence, without any wait points. While the diagram displayed is quite simple, it will be appreciated that, in a real application, the activity diagram may be more complex. For example, it may have looping constructs to handle a case where an order is only partially allocated. In such a case, a business may wish to create one picking list right away for items in stock, and loop around to create another picking list when the remaining items come into stock, but the diagram shown in FIG. 5 illustrates the basic points.

FIG. 5 illustrates that each activity 268-272 is associated with the entity 262-264 that it operates on. For instance, given an Order entity 262 as an input, the AllocateOrder activity 268 contains the business logic to allocate inventory for items on the order. Given an Order entity 262 as an input, the CreatePickingList activity 270 contains the logic to create a new picking list entity 264 from the specified Order 262. Basically, any items which are successfully allocated in the previous step are moved on to the new picking list. The PickingList 264 instructs the inventory staff to pick the allocated items off the shelf and put them in a box for shipment. Finally, the CreatePackingSlip activity 272 takes a PickingList entity 264 as an input, and creates a PackingSlip entity 266 which is then attached to the box for shipment.

It should be noted that developer needs a way to address or identify the particular process to be interacted with. Because the developer does not directly control the process, one way for this to be done is that one entity type instance corresponds 1-to-1 with a process instance so that they can be seen as the same thing. If all the activities described here correspond to one process, then each of them indicates the affected order so the framework can look up the process. It will be noted that, for the sake of simplicity, FIG. 5 does not show such a "primary" or "process" entity, but would normally be provided.

Relating diagrams 260 and 261 to the model shown in FIG. 2, activities 268-272 corresponds to activity steps 212 in model 202 shown in FIG. 2. The specific ordering of activity steps shown in diagram 261 in FIG. 5 corresponds to one workflow 214 shown in model 202 in FIG. 2. The activation 218 in FIG. 2 corresponds to an operation call representing the order received in FIG. 5, and the outcome 222 corresponds to an operation call identifying the state in which the process is concluded. Of course, an entity which indicates that the process is running or has concluded may also be a visible property 216 shown in FIG. 2 as well. The order itself may be provided to the process by making an operation call as an income, or as an activation, or the order may be represented by the process itself. Also, Order 262, PickList 264 and PackingSlip 266 are all entities.

Figure 6:
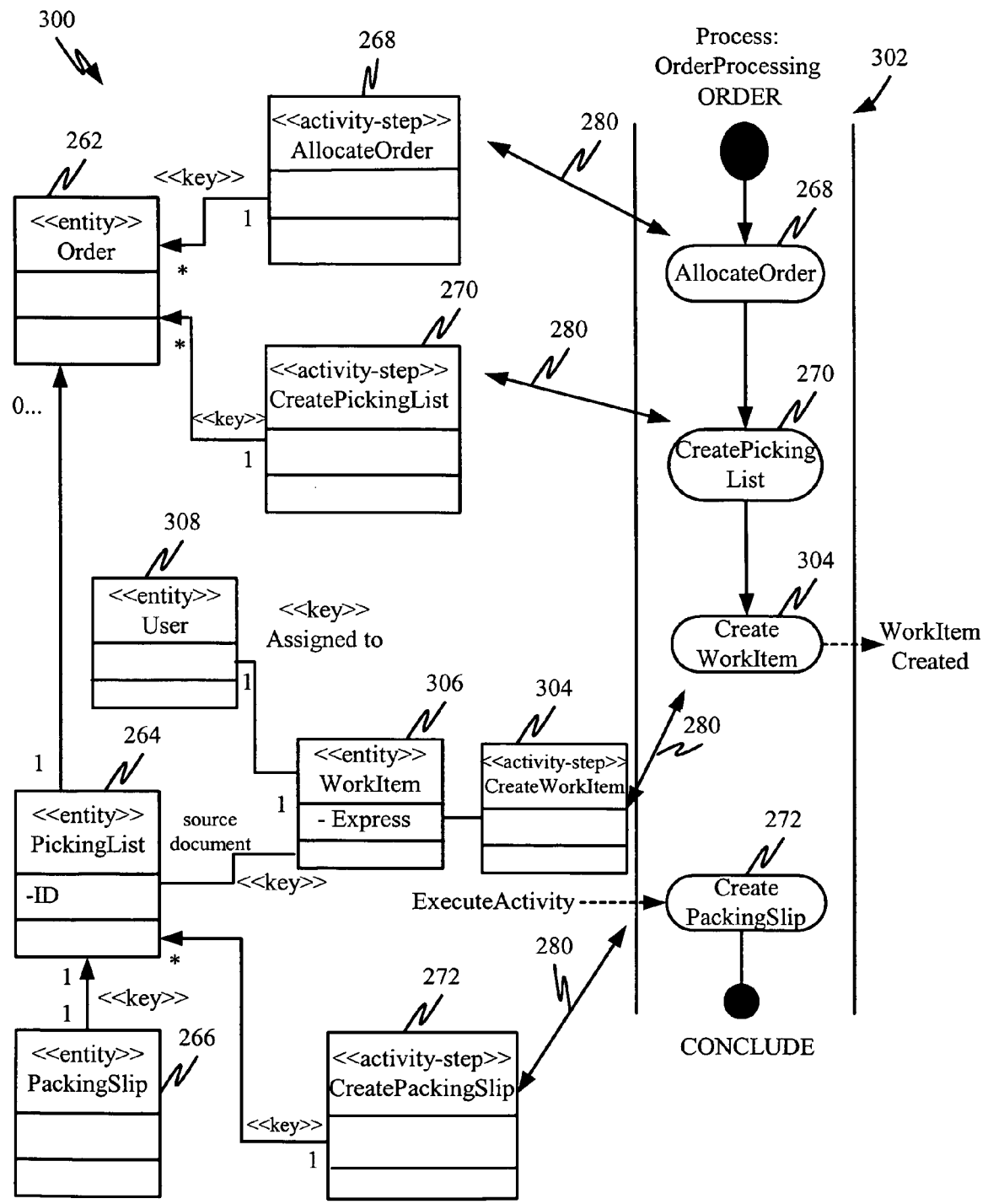
FIG. 6 illustrates a concrete example of a UML class diagram and UML activity diagram for a model of a process.

FIG. 6 illustrates a UML class diagram 300 and a UML activity diagram 302 for a slightly more complex process. A number of the items are similar to those shown in FIG. 5 and are similarly numbered. The diagram shown in FIG. 6 introduces a work item into class diagram 300 and process activity diagram 302. The work item introduces into the previously automated process (that shown in FIG. 5) a wait point for a human action. In other words, the process dispatches a "to do" notification to a user and waits for the user to respond. Once the user responds, the automated process resumes.

The process shown in FIG. 5 is sufficient if all processing is supposed to run automatically. However, in a true application, the CreatePackingSlip activity 272 would likely not run automatically after the CreatePackingList activity 270. In a conventional warehouse, the picking list would first print. Then, the warehouse staff would pick up the list from the printer and walk through the warehouse picking the goods. When the boxing is complete, the staff would normally manually execute the CreatePackingSlip activity 272, which signals that the box is ready to ship.

In FIG. 6, activity diagram 302 shows that, again, once an order is created, inventory is allocated and the picking list is created automatically by activities 268 and 270. However, once the picking list is created, the activity labeled CreateWorkItem 304 generates a WorkItem entity 306 (which represents the "to do") and assigns it to user 308. The process then stops automatic execution by emitting a WorkItem Created status message illustrated in diagram 302. As with FIG. 5, a primary or process entity would normally be provided, but is not shown for the sake of simplicity.

Once the status message is emitted, the process pauses until a message is received from the user 308 to execute the CreatePackingSlip activity 272, at which point the process resumes.

Class diagram 300 shows that the human-based wait point has been introduced to generate the WorkItem 306 (i.e., the "to do") and assign it to user 308. The WorkItem 306 is illustratively associated to one or more activities. In the embodiment shown in FIG. 6, the User 308 has only one choice, to create the PackingSlip 272. However, other common scenarios could involve a choice such as approval or denial of a certain request, etc. In such a case, the WorkItem 306 holds multiple references to activities, one for each choice. In one illustrative practical application in which the model illustrated in FIG. 4 is implemented, at runtime a query service might illustratively query the system for all WorkItems 206 assigned to a given User. The query service would illustratively use the model shown in FIG. 4 to traverse the entities and activities to aggregate data from multiple entities and activities into the query results. The query results would illustratively list all of the workflow tasks including WorkItem 306 (assigned to the user). Such items can be displayed to the user and the user can take whatever desired action is necessary for the process to continue. For instance, the user may select (from a user interface display) a "Create Packing Slip" option which re-starts process execution, and the cycle is completed.

There are multiple different ways in which the model 202 (represented by the diagrams in FIGS. 5 and 6) can be generated, and the specific way in which tool 204 is used by the user to generate the model is not important for purposes of this discussion. However, two ways will be described for the sake of example.

Figure 7A:
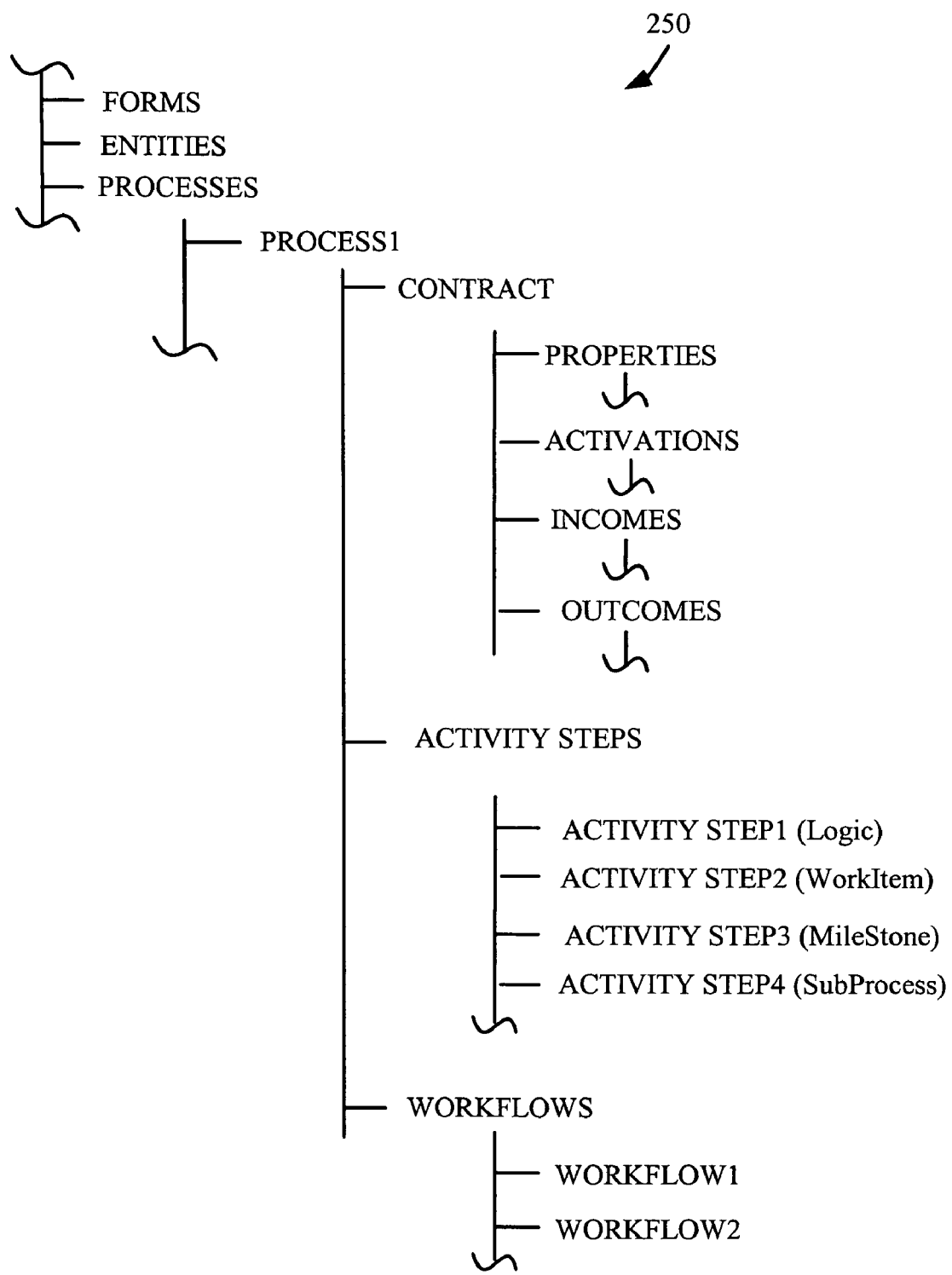
FIG. 7A shows a metadata structure representing the model shown in FIG. 2.

FIG. 7A shows one exemplary metadata structure 250 which defines a process. The process "PROCESS1" includes a contract (realized using mechanisms for managing data and executing business logic—such as entities and operations—already used on the framework on which the process definition is built), activity steps and workflows. The metadata structure 250 shows that the contract includes properties, activations, incomes and outcomes. Structure 250 also shows that the activity steps include logic, a work item, a milestone and a subprocess.

The user will illustratively generate model 202 simply by modifying the tree structure 250 in metadata (creating, deleting and moving nodes in tree structure 250) to define different processes. The user can do this by adding or re-arranging any of the items in the process, including any items in the contract, activity steps or workflows.

Figure 7B:
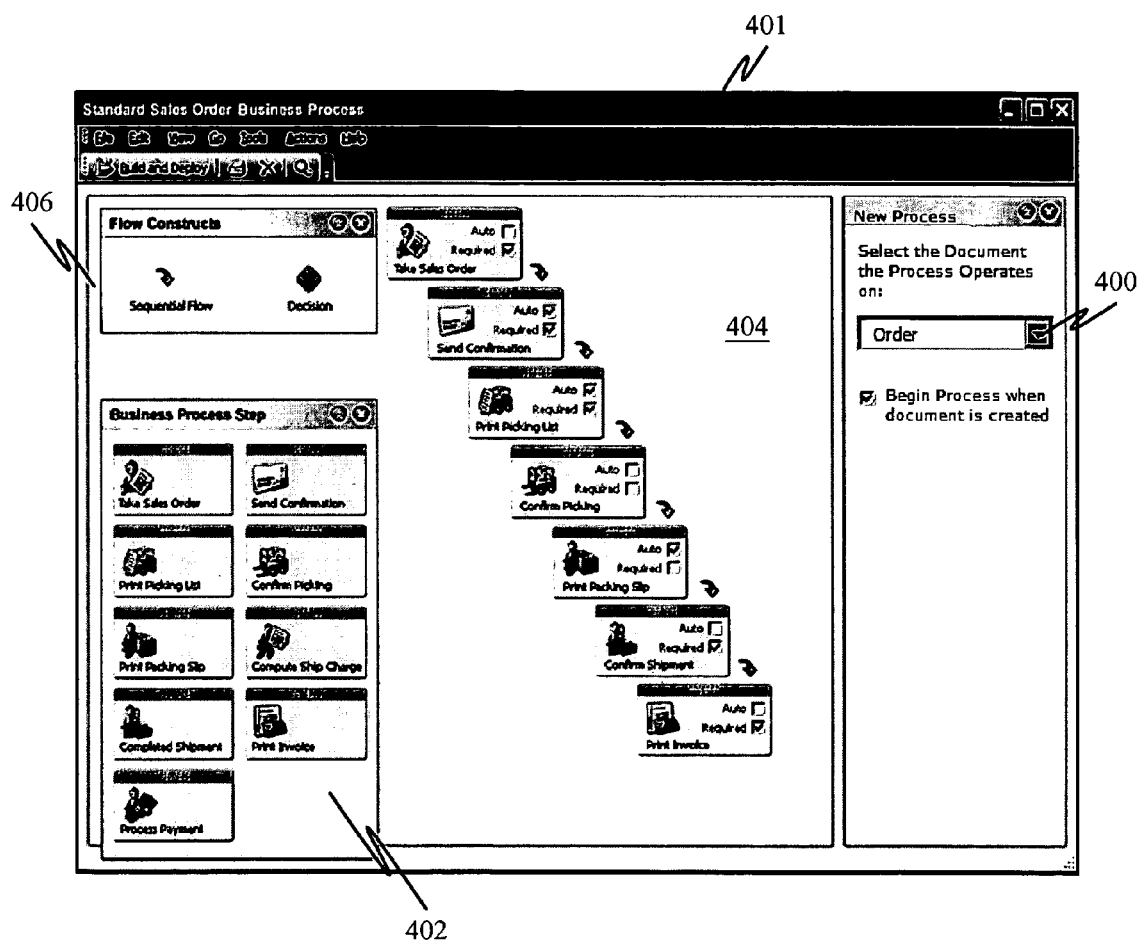
FIG. 7B illustrates an exemplary user interface display showing how a model can be generated.

FIG. 7B shows one exemplary embodiment of a tooling approach in which a process model can be generated. In the embodiment shown in FIG. 7B, it is assumed that a class diagram has already been generated which specifies entities, operations, and associated activities, for the process being designed. To continue designing the process, the author first selects an entity of focus and enters into that entity into field 400 on user interface display 401. In the embodiment shown in FIG. 7B, the entity chosen for focus is an Order entity. This effectively gives the designer a starting point on the class diagram to operate from. Moreover, it means that the identity of the Order is effectively the identity of the process. This maybe referred to as the Process Entity.

Given the entity for context, the tool displays a palate 402 of process steps or activity steps that can operate on that particular entity. The designer can easily arrange activities which operate on the entity by dragging them out onto the designer surface 404 of display 401 and sequencing them into a process schedule using one of the selectable flow constructs 406. It will be noted in FIG. 7B that additional activities, other than those shown in FIGS. 5 and 6 are included, by way of example.

FIG. 7B shows that the deep semantic knowledge contained in the model 202 (represented by diagrams 300 and 302 in FIG. 5) enables the process to be designed without any imperative code. In order to generate the imperative code, the focus entity of the process is simply passed to the selected activity and imperative code is generated, if needed.

Figure 8:
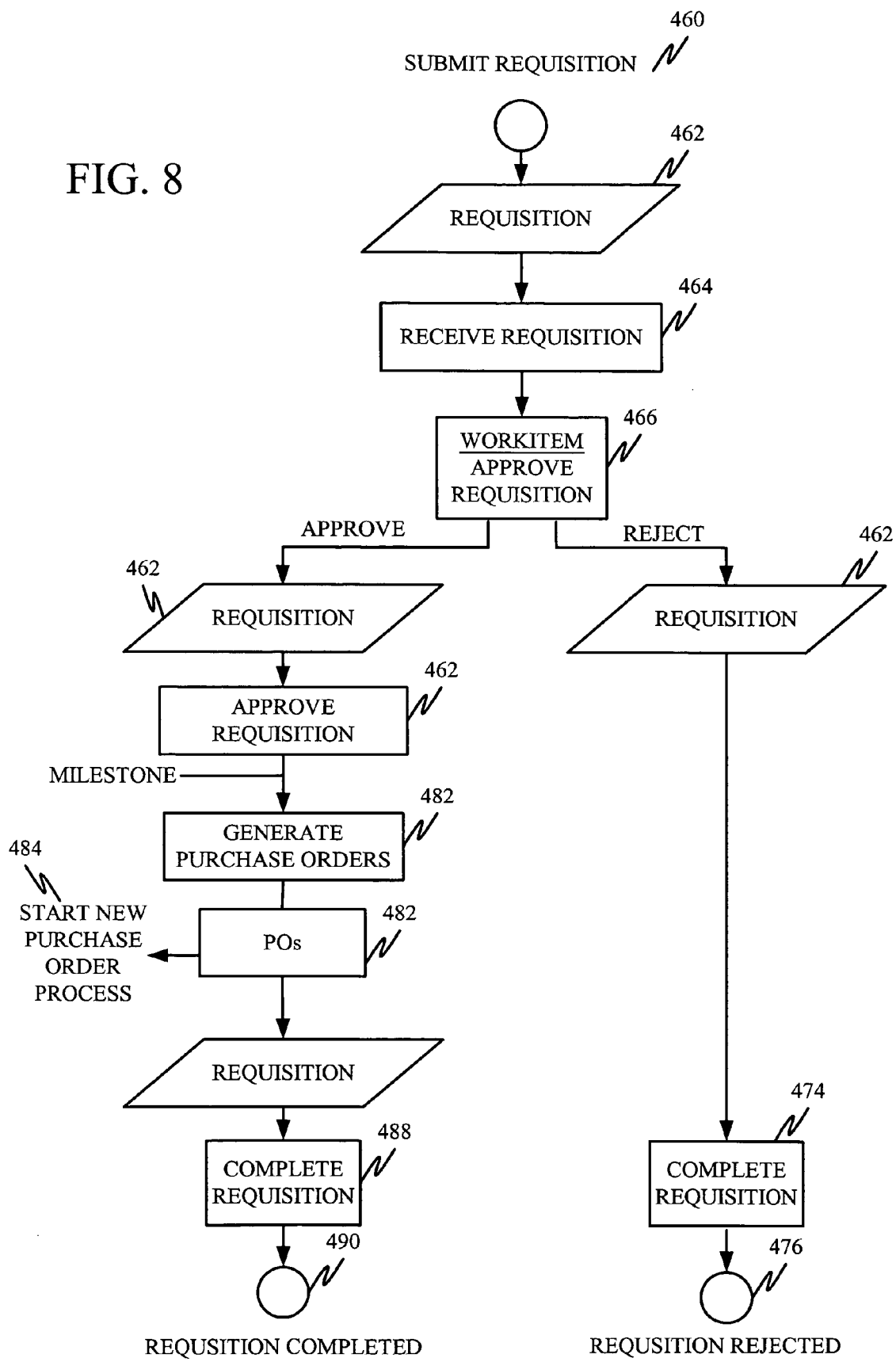
FIG. 8 shows an activity diagram for another exemplary process.

FIG. 8 illustrates another, slightly more complex process for the sake of example. In FIG. 8, the process is one which is initiated by a requisition, which is either approved or rejected. If it is approved, then a purchase order is generated and the requisition is completed. If it is rejected, the requisition is completed as rejected. It will of course be understood that FIG. 8 illustrates only one workflow for the modeled process. There may well be more than one workflow in the modeled process, and the runtime subsystem selects a workflow based upon one of a variety of different criteria, such as those described above with respect to FIG. 2. For instance, the determination can be made based on metadata, a configuration value, a business logic rule, etc.

In any case, FIG. 8 shows that the process has, as an activation, the Submit Requisition activation 460 and the requisition 462, itself, is illustratively provided with activation 460, or as a separate income to the process. Again, these are illustratively realized as operations.

FIG. 8A illustrates an exemplary user interface display 461 which shows how a user may illustratively enter a new Requisition 462 to start the process shown in FIG. 8. The example shown in FIG. 8A has a variety of descriptive information regarding the Requisition, which is first filled in by the user. The user then actuates the Submit button 463 which passes the Requisition, as an activation, to the process, to start the process.

Next, the Receive Requisition activity 464 is executed by the runtime subsystem. The Receive Requisition activity 464 may illustratively validate the Requisition using business logic and set a requisition status value to "received". The Receive Requisition activity 464 may also illustratively save, or persist, the Requisition itself.

Once the Receive Requisition activity 464 has completed, Requisition 462 is passed to WorkItem 466. WorkItem 466 requires human intervention, in this case, to either approve or reject the requisition.

FIG. 8B shows another exemplary user interface display 468 which can be used by a user to perform the WorkItem of either approving or rejecting the Requisition 462. Display 468 in FIG. 8B shows that the Requisition 462 can be displayed to the user who has authorization to perform the WorkItem 466, and the user can either actuate the Approve button 470 or the Reject button 472.

If the user rejects the Requisition 462, the Requisition 462 is passed to the Reject Requisition activity step 474 shown in FIG. 8. The Reject Requisitions activity step 474 illustratively sets the requisition status indicator to rejected and persists or saves the Requisition 462. The process then generates the requisition rejected outcome 476. This is illustratively done with an operation call.

If, however, at WorkItem 466, the user approves the requisition by actuating the Approve Requisition button 470 shown in FIG. 8B, the Requisition 462 is provided to Approve Requisition activity step 478. The Approve Requisition activity step 478 illustratively sets the requisition status indicator to approved and persists the requisition.

The process then generates milestone 480. In the illustrated embodiment, milestone 480 is simply a property representing the status of the running process. Of course, the milestone could be any other desired milestone activity step.

Processing then continues by executing the Generate Purchase Orders activity step 482. In activity step 482, the process generates a plurality of Purchase Orders 484 to fill the Requisition 462. For instance, the exemplary Requisition being discussed is requesting five laptop computers and two hundred copies of a report. Therefore, Purchase Orders for these items are generated by Generate Purchase Orders activity step 482. The process shown in FIG. 8 also shows, at this point, that the process provides an outcome 484, which is a Start New Purchase Order process outcome that signifies that a new purchase order process should be activated. The new purchase order process illustratively identifies a source to fill the Purchase Order 482 which were generated by the process shown in FIG. 8 and illustratively automatically assigns the purchase orders to a vendor, along with a contract price, and sends the purchase order to the vendor. Of course, the new purchase order process started by outcome 484 could be other processes as well, and the one described is provided for exemplary purposes only. It should also be noted that the new purchase order subprocess may, itself, start additional processes such as a process which obtains quotes from various vendors, prior to sending a purchase order to a vendor, or a process which simply selects a vendor and obtains a quote from the vendor prior to sending the purchase order. Of course, a wide variety of other processes could be initiated as well.

In any case, once the New Purchase Order process has been activated, the process shown in FIG. 8 executes the Complete Requisition step 488. Activity step 488 illustratively sets the requisition status indicator to completed and then provides the Requisition Completed outcome 490.

Figure 9:
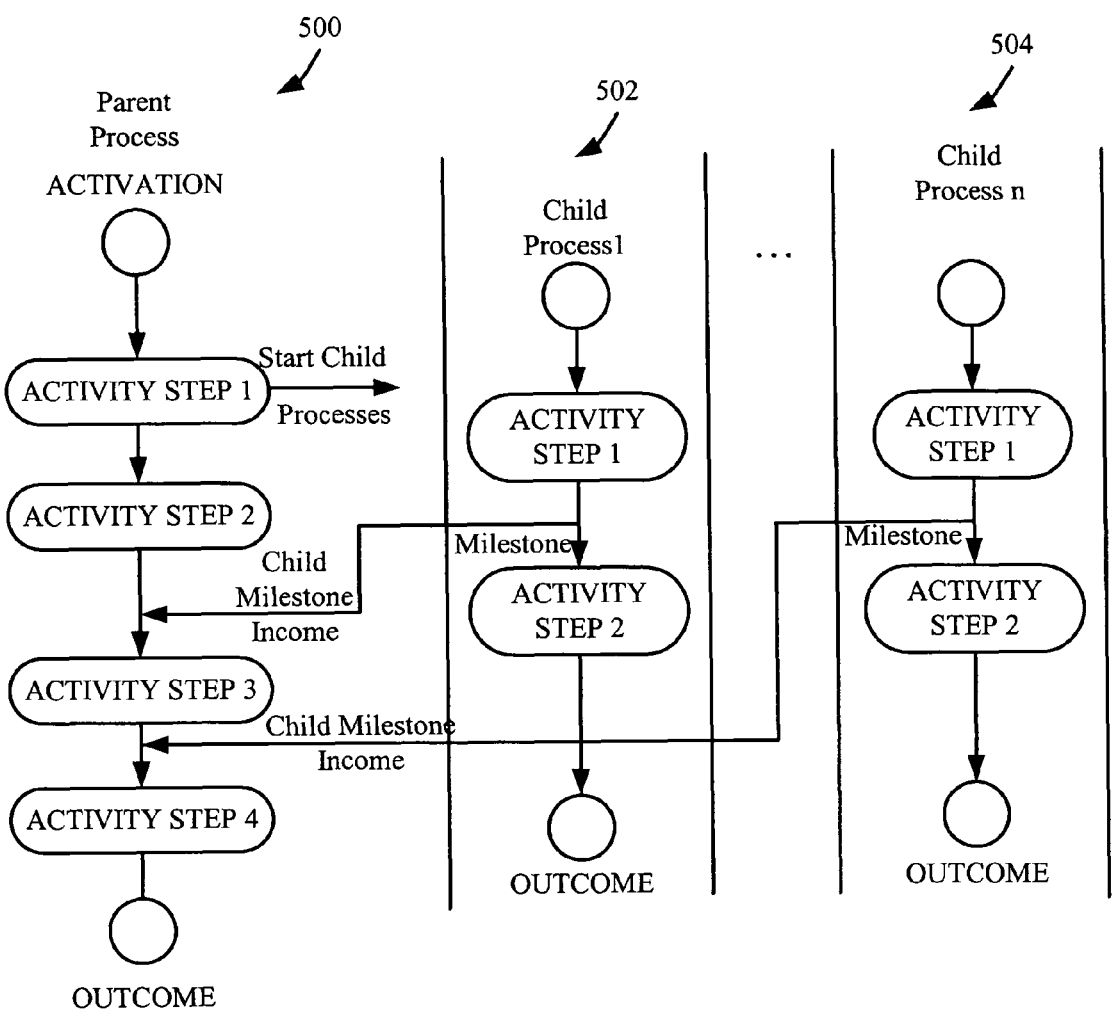
FIG. 9 illustrates one example of a process pattern.

FIG. 9 illustrates a model in accordance with one illustrative embodiment of the present invention which can be used to capture process patterns. For instance, a process can have discoverable structural or behavioral patterns that can be captured in metadata and applied multiple times when building an application. The pattern illustratively has a semantic linkage to instances where it has been applied, so that, when the base pattern has changed, it can easily be determined where else in the application that the pattern needs to be updated, either automatically or manually. In the case of manual update, the system simply throws a flag or an error indicating that a certain portion of the application is based on a pattern which has been changed.

FIG. 9 illustrates one exemplary pattern in which a parent process 500 interacts with a plurality of processes shown as child process 1, 502, and child process N, 504. The parent process 500 has four activity steps. Activity step 1 starts one or more of the child processes 502 and 504. Parent process 500 also pauses after activity step 2 until it receives a milestone, as an income, from child process 502. Parent process 500 pauses after activity step 3 until it receives a milestone, as an income, from child process 504. The milestones represent the current status of the running child processes 502 and 504. This property is set by calling a milestone activity step operation. Whenever the milestones are reached by the child processes 502 and 504, parent process 500 receives an income that notifies the parent of the milestone change. The parent process 500 can then respond as appropriate, including making a determination of whether to execute a milestone activity step as part of its running process, whether to continue running other activity steps, etc.

Of course, the pattern shown in FIG. 9 is provided merely as one simple example of how a process pattern involving a parent process and child processes might be applied. The present invention is not limited to that example, and the process patterns captured in metadata can vary widely, and can be applied in substantially any desired way.

Figure 10:
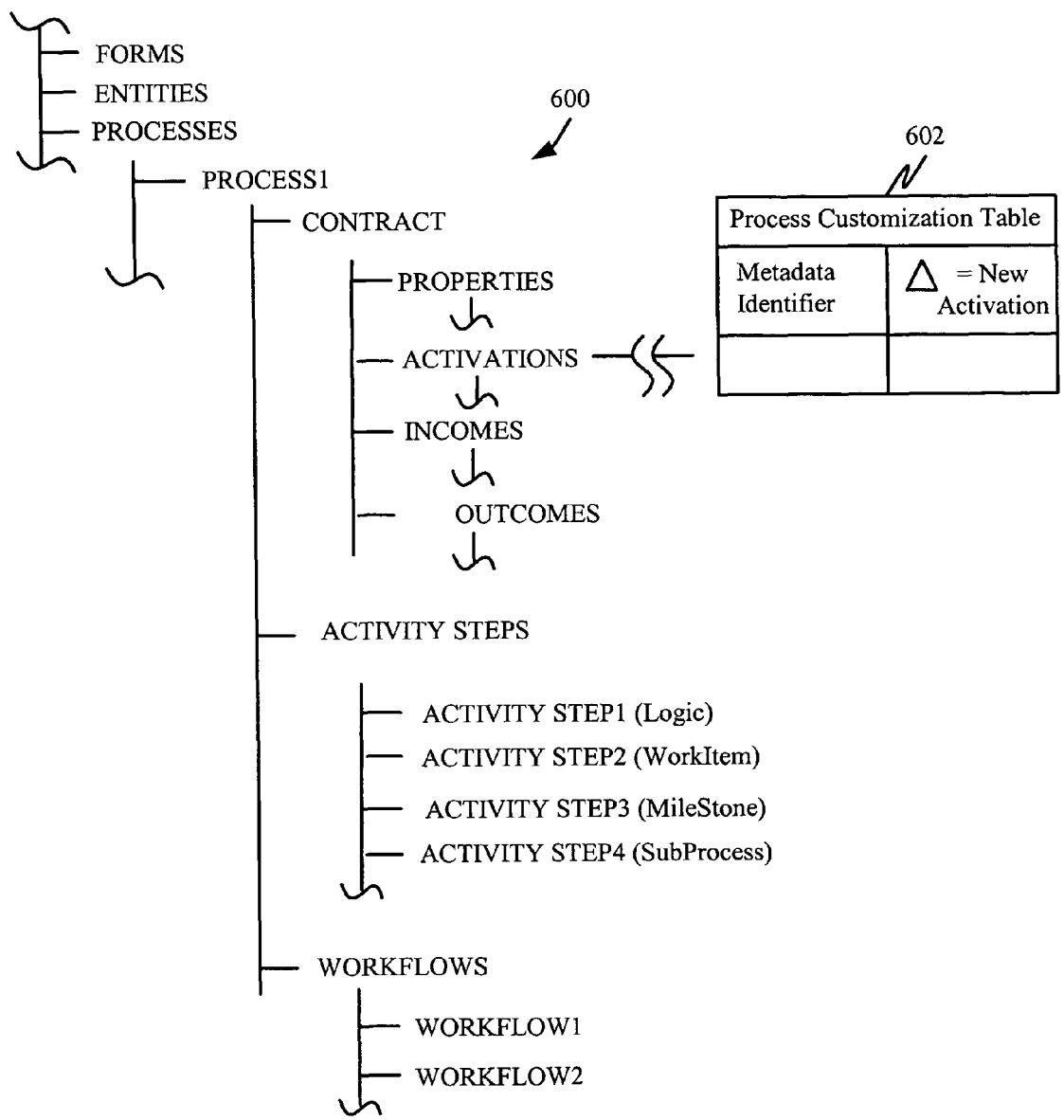
FIG. 10 illustrates one example of customizing a process.

FIG. 10 illustrates one embodiment in which a process is customized, or modified. FIG. 10 shows a metadata structure 600 similar to that shown in FIG. 7A. However, FIG. 10 also shows a process customization table 602 which contains customizations to the process defined in metadata structure 600. The process shown by structure 600 represents a base process created by one party. However, that may be customized by zero or more additional parties after the base workflow has been created and delivered to market. For instance, customizations may be made for a particular customer or even for a particular department within a customer, once the process application has been deployed.

The changes to the base process are referred to as deltas. The deltas are stored separately from the base process 600, in table 602, and are only applied to the base process 600 when the application running the process is deployed. Some examples of customizations to a workflow include adding activity steps, removing or replacing activity steps, changing data and control flow, etc.

The process customization table 602 shown in FIG. 10 illustrates that changes to the activations in process 600 are made as customizations. The metadata identifier in table 602 identifies the activations metadata in structure 600 and the delta entry identifies a new or different activation which is used to activate the process, once the process has been customized.

Storing the customizations separately from the base process provides a number of advantages. For instance, the customer may only want to apply customizations in a certain context, such as when the process is run in a given department within the customer. Similarly, the customer may be having problems with the customized process and may simply want to turn off the customizations. Reverting to the base process becomes very simple, if the customizations are stored separately and only applied when desired. Similarly, updates to the base process can easily be made without worrying about customizations. When the base process 600 is updated, customizations in table 602 can then be applied to the updated base process 600. The customizations are simply not intertwined with the base process, making updates much more simple and quick.

In addition, it may occur that a user wishes to merge two different sets of customizations. This can be easily accomplished simply by applying both sets of customizations to the base process 600. There may be a need for a conflict resolution component in the event that two customizations are drawn to a same part of the base process. However, multiple sets of customizations can be applied to the base process in relatively easy fashion.

Further, the user can declaratively express how a delta gets applied. For instance, the user may indicate, declaratively, that the customizations are to be applied before a given activity step, milestone, or other item in the base process, and after a different milestone, etc. This provides a great deal of versatility in applying customizations.

It can be seen that the process model definition is realized using the mechanisms for managing data and controlling and interacting with business data that are already found on the framework on which the process model definition is built. Thus, the model definition is fully integrated with the framework in that no additional programming model needs to be used when dealing with the process. Similarly, as these mechanisms are modified and enhanced, the modifications and enhancements are automatically available to the process definition. In one exemplary embodiment, the mechanism for handling data management (e.g., properties) includes entities and the mechanisms for dealing with business logic or interacting with and controlling a process (e.g., activations, incomes, outcomes) includes operations.

It can also be seen that the declarative model of the present invention thus describes processes within business software applications in such a way that an abstract model is developed describing processes and their relation to other processes, independent of workflow implementation. The model captures data aspects of a business process and allows this data to be associated with other domain data, providing the ability to link process and data usually found in business applications. The modeling includes a set of process and workflow abstractions which captures the attributes of a process, such as how the process is started, what comes in and out of the process, visible data processes, etc., and the process can be supported by zero or more actual implementations of workflow, so the workflow acts as one implementation of an abstract process represented by the model.

A selectivity mechanism is also provided such that when it comes time to run a process, a selection determination is made as to which workflow to use. Of course, this selection can be made at configuration time as well as at runtime. Because there is a separation between the abstract representation of the process and the technology-dependent implementation of workflow, different implementations of the process can be swapped out (i.e., different workflows) either at implementation of the process or at runtime.

In addition, in one embodiment, the process remains as an entity, even after it has completed execution. Traditionally, workflow is viewed as something which is currently running, and at times, status can be obtained from the workflow. However, if the workflow has completed execution, there is conventionally no representation of the workflow that remains. However, with one embodiment, the process is represented by an entity which can simply be queried for its status and other observable properties of the process entity. Also, because it is an entity, it has associative relationships to the data that it changed. Therefore, a user can easily determine what data is affected by a given process, what process created the data, etc. The present system also provides the ability to easily capture and apply process patterns, and to make customizations to a base process.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of selectively activating a computer-implemented process, comprising:

defining the process in metadata in a metadata store of an application development framework, the metadata including a process contract, a set of activity steps, and a set of workflows, the set of workflows providing a sequence for the set of activity steps to achieve a business goal, the process contract defining initial and interim inputs and outputs to the process and data properties for the process, the application development framework including common building blocks, tools, and services to create business applications, the application development framework having a data programming model for managing data in the business applications built on the application development framework and a business logic programming model for interacting with business logic in the business applications built on the application development framework, the data programming model managing data utilizing entities, the business logic programming model interacting with the business logic utilizing operations, the process being defined utilizing the entities and the operations such that the process and the application development framework are fully integrated, wherein defining the process in metadata comprises:

configuring the metadata to define management of data in the process using the data programming model of the application development framework; and configuring the metadata to define interactions with business logic in the process using the business logic programming model of the application development framework;

receiving an operation call within the application development framework, wherein the framework utilizes a computer processor that is a component of a computing device to access and evaluate the metadata in the metadata store so as to make a determination as to whether the received operation call is linked by association to the process defined in the metadata;

if it is determined that the operation call is linked by association to the process defined in the metadata, then creating and starting an instance of the process by generating a group of the entities that are necessary for the process and activating a mechanism necessary to control the process; and if it is determined that the operation call is not linked by association to the process or any other process defined in the metadata, then calling a collection of developer's code as necessary to support processing of the operation call outside of the process.

2. The method of claim 1 wherein the operation call received within the application development framework comprises a function call to the business logic programming model, and wherein each of the operations includes two portions, a first one of the two portions including a message and a definition of the message, a second one of the two portions including a message processor that processes the message.

3. The method of claim 1 wherein the operation call received within the application development framework comprises a message to the business logic programming model, the message including a data payload, and wherein the process contract defines the initial and the interim inputs utilizing incomes, the incomes providing defined entry points into the process while it is running, the incomes requiring and consuming business data as inputs, the process contract defining initial and interim outputs utilizing outcomes, the outcomes providing defined exit points from the process while it is running, the outcomes defining and producing business data as outputs.

4. The method of claim 1 wherein configuring the metadata to define interactions with business logic in the process comprises:

defining messages that are consumed and generated by the process in conjunction with the business logic programming model; and wherein defining the messages comprises:
defining an activation message for activating the process using the business logic programming model; and
defining incomes to the process and outcomes from the process using the business logic programming model.

5. The method of claim 1 wherein selectively activating the process comprises choosing and initiating one of the workflows in the set of workflows.

6. The method of claim 1 wherein configuring the metadata to define management of data in the process comprises:
representing visible properties of the process using the data programming model, the visible properties indicating whether the process is running or whether the process has concluded.

7. The method of claim 1 wherein configuring the metadata to define management of data in the process comprises:
representing an instance of the process using the data programming model, the instance of the process corresponding one-to-one with an entity type instance.

8. The method of claim 1 wherein the entities provide entity persistence and are saved to and retrieved from the metadata store of the application development framework.

9. The method of claim 1 and further comprising:
interacting with the process using services provided by the application development framework, the services including persistence storage, query capabilities, analytics, and customization.

10. The method of claim 9 wherein interacting with the process comprises:

storing the process using the persistence storage service of the application development framework; and
querying data associated with the process using the query capabilities service provided by the application development framework.

11. The method of claim 9 wherein interacting with the process comprises:
querying data associated with the process for work items assigned to a user of the query capabilities service provided by the application development framework.

12. The method of claim 9 wherein interacting with the process comprises:
customizing the process using the customization service provided by the application development framework, the process customization including a milestone operation call.

13. The method of claim 9 wherein interacting with the process comprises:
performing analytics on the process using the analytics service provided by the application development framework.

14. A method of controlling a computer-implemented process, comprising:

receiving a call at an application framework, the call being of a form used in a business logic programming model that is used by the application framework to interact with business logic;

accessing a metadata store in the application framework that stores one or more model definitions, each of the one or more model definitions defining a process, each of the processes managing data and executing business logic utilizing entities and operations, the entities and the operations also being utilized by the application framework on which the one or more model definitions is built, each of the process definitions including a metadata structure stored in the metadata store in the application framework, each of the metadata structures including a contract, activity steps, and workflows, each of the contracts including properties and activations, each of the activity steps including logic, a work item, a milestone, and a subprocess, each of the one or more model definitions generated by modifying a tree structure in the metadata store, each of the tree structures having a plurality of nodes and subnodes, wherein the contract, the activity steps, and the workflows are arranged in subnodes of the node associated with the corresponding model definition;

utilizing a computer processor that is a component of a computing device to compare the call to a collection of information in the metadata store so as to determine whether the collection of information indicates a link by association between the received call and an activation to a process;

if the determination indicates that the collection of information does indicate said link by association between the received call and the activation to the process, then:
responding to the determination by activating the activation thereby creating an activated instance of the process;
interacting with the activated instance of the process using the business logic programming model and a data programming model used by the application framework to manage data in applications built on the application framework; and if the determination indicates that the collection of information does not indicate said link by association between the received call and the activation to the process, then calling a collection of developer's code as necessary to support processing of the call outside of the process.

15. The method of claim 14 wherein interacting with the activated instance of the process comprises:
sending incomes to the process and receiving outcomes from the process using the business logic programming model, the incomes being operations that provide defined entry points into the process when it is running, and the outcomes representing defined exit points from the process when it is running.

16. The method of claim 14 wherein interacting with the activated instance of the process comprises:
managing visible properties of the process using the data programming model; and
indirectly interacting with the activated instance of the process utilizing developer's code by calling the operations and changing the entities.

17. A computer-implemented application development framework, comprising:
a service component that provides services to an application developed within the application development framework, the application development framework being a business framework that includes building blocks, tools, and services to create business applications, the building blocks including security tools and a web service interface, the application development framework utilizing entities to manage data, to provide entity persistence, and to interact with a process, the entities being saved to and retrieved from a database through the business framework, the services provided by the framework also including query, analyzing, and customizing services, the framework further providing operations that interact with and control a process, each of the operations including two portions, a first one of the portions including a message and a definition of a message, a second one of the portions including a message processor that processes the message;
a metadata store including metadata defining the process, wherein the process is controlled and accessed utilizing the operations that are part of the development framework, the process including activations that initiate a workflow associated with the process, the activations having input parameters that specify data, the input parameters being passed to one of the operations as a payload income to the process;
wherein the service component receives a call to the application framework and, based on a status of the call reflected in a collection of information in the metadata store, either activates or does not activate the process; and
a computer processor that is a functional component of a computing device, the computer processor being utilized by the service component to facilitate a determination of said status of the call.

18. The application development framework of claim 17 wherein the application development framework comprises a data management programming model and a business logic programming model that are both utilized to execute the process when the process is activated, and wherein the process includes a plurality of activity steps, the plurality of activity steps representing units of work that are arranged in the workflow, the plurality of activity steps including a business logic operation call, a work item operation call, a sub-process call, and a milestone operation call.

* * * * *